Feb. 5, 1963   G. H. CHARLTON ET AL   3,076,622
JET DEFLECTING FLAP FOR A JET FLAP AIRCRAFT
Filed April 17, 1961   3 Sheets-Sheet 1

George Hubert Charlton
Ernest Leonard Allen
Inventors
By
Stevens Davis Miller & Mosher
Attorneys George Hubert Charlton
Ernest Leonard Allen
Inventors By
Stevens, Davis, Miller & Mosher
Attorneys 3,076,622
JET DEFLECTING FLAP FOR A JET FLAP AIRCRAFT
George Hubert Charlton, Luton, and Ernest Leonard Allen, Dunstable, England, assignors to Power Jets (Research and Development) Limited, London, England, a British company
Filed Apr. 17, 1961, Ser. No. 103,566
Claims priority, application Great Britain Apr. 21, 1960
13 Claims. (Cl. 244—42)

The present invention relates to the construction of a jet deflecting flap for a jet flap aircraft.

In a jet flap aircraft a jet stream is discharged from the rear of a wing as a long shallow sheet over the upper surface of a trailing edge wing flap which serves to deflect the jet stream. This stream will in many cases be at a high temperature—possibly as high as 600° C.—and it is therefore a requirement that the flap shall be so constructed that its upper surface, which is exposed to the jet stream, shall as far as possible be free to expand in all directions to minimise the risk of thermal distortion while maintaining its profile. This requirement is of especial importance in relation to the forward part of the flap upper surface since this will be screened from the jet stream when the flap is raised and exposed thereto when the flap is lowered, and will thus experience extremes of temperatures.

Accordingly the invention provides a flap comprising inner supporting structure and at least one panel forming the flap upper surface, the panel being secured to the supporting structure by means permitting free expansion of the panel both chordwise and spanwise.

According to one feature of the invention the inner supporting structure includes a plurality of chordwise-extending formers, each corresponding in profile to at least part of the flap upper surface, and the panel is secured to an intermediate former only at a position intermediate the leading and trailing edges, and is secured to the other formers by means permitting free expansion of the panel both chordwise and spanwise.

According to a further feature of the invention the flap includes an internal spanwise-extending torque tube and the formers are supported on the torque tube by means permitting free expansion of the formers in a chordwise sense.

According to yet another feature of the invention the flap is formed with gaps near its leading and trailing edges to permit the flow of air through its interior.

An embodiment of the invention will now be described by way of example with reference to the accompanying drawings, of which:

Figure 1:
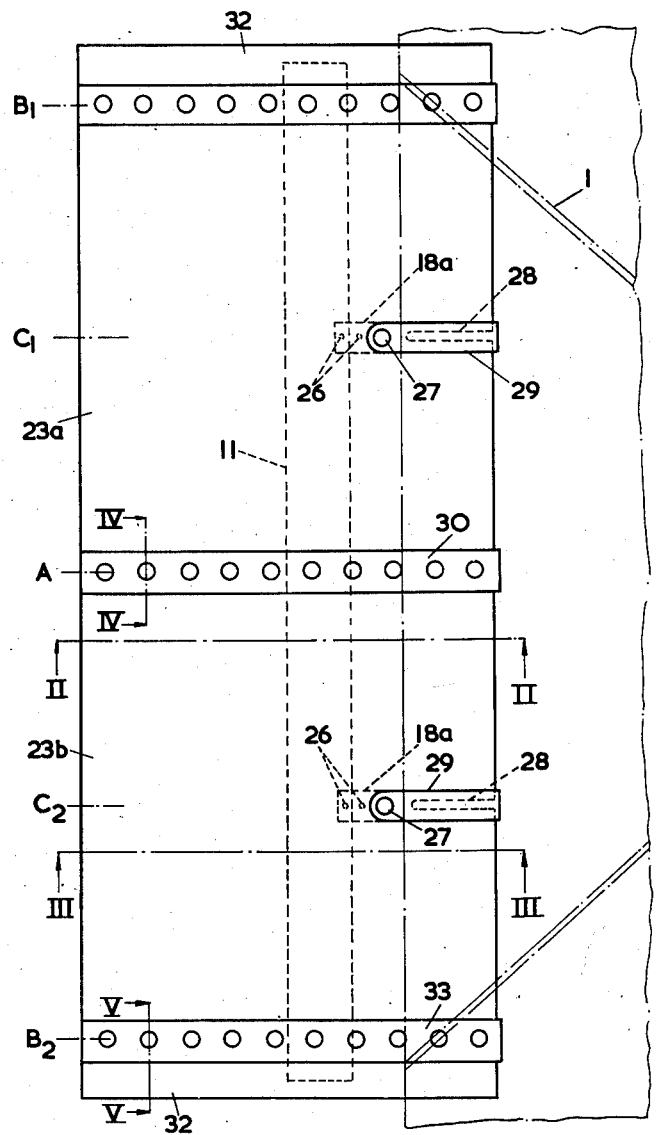
FIGURE 1 is an extrenal view of a jet deflecting flap for a jet flap aircraft.

The flap shown in the drawings is intended for use in a jet flap aircraft which might be of the type shown in United States Patent No. 2,961,192 (Davidson et al.) or No. 2,973,165 (Davidson). Such an aircraft comprises a number of gas turbine jet propulsion engines which have their jet pipes connected to jet nozzle units which change in cross-section from circular at the inlet to terminate in long shallow jet nozzles extending spanwise of the wing. The rearward end of such a nozzle unit is shown at 1 in FIGURE 2. The jet stream is discharged from the nozzle 2 as a long thin jet sheet rearwardly over the upper surface of the trailing edge wing flap 3 and by raising and lowering the flap the jet sheet can be deflected upwardly and downwardly from the rearward direction. It will be understood that the flap can also in some circumstances perform the functions of an aileron.

The flap 3 is built up around an internal spanwise extending torque tube 11 and is pivotally mounted on an axle 12 supported at its ends on the wing ribs (not shown). A lever 13 is attached to one end of the torque tube and an operating jack 14 is connected to this lever.

Figure 2:
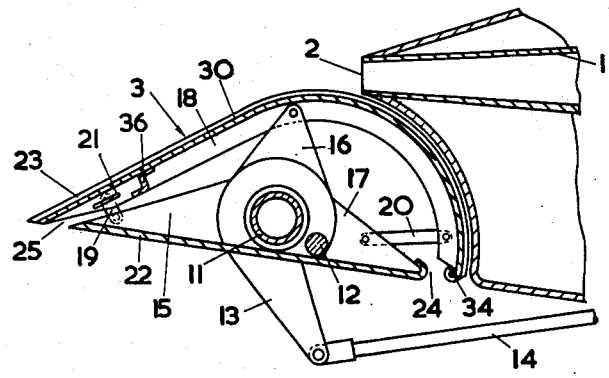
FIGURES 2 and 3 are chordwise sectional views of the flap, taken on the lines II—II and III—III in FIGURE 1.

At three stations along the span of the flap—station A at mid length and stations $B_1$ and $B_2$ close to the ends—channel-section arms 15, 16, 17 are rigidly attached to the torque tube—see FIGURE 2. These arms support a chordwise-extending channel-section former 18 corresponding in profile to the flap upper surface. The former 18 is pivotally attached to arm 16 at a position corresponding to the junction of the curved and flat portions of the flap upper surface, and is connected to arms 15, 17 through links 19, 20 respectively. Link 19 is rigidly connected to arm 15 at one end but at the other end it is secured to the former by a bolt which is free to slide chordwise in a slot 21. The link 20 is pivotally connected at its ends to arm 17 and to former 18.

Figure 3:
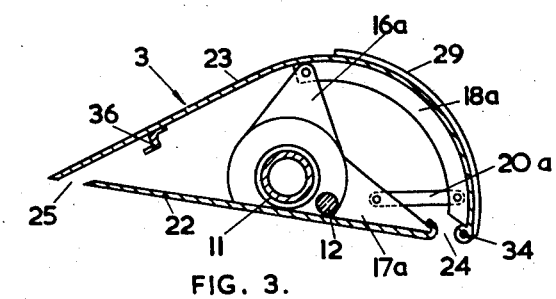

At stations $C_1$ and $C_2$ intermediate stations A, $B_1$ and A, $B_2$, further channel section arms 16a, 17a are rigidly attached to the torque tube 11—see FIGURE 3. These arms are similar to arms 16, 17 already described, but there is no arm equivalent to arm 15 at these stations. The arms 16a, 17a support a channel-section former 18a corresponding in profile to the forward part of the flap upper surface, the former being pivotally attached to arm 16a and connected to arm 17a through a link 20a similar to link 20 previously described.

It is to be noted that some components appearing in FIGURE 2 should also be seen in FIGURE 3, but these have been omitted for the sake of clarity.

The skin 22 forming the flap under surface is attached to arms 15, 17, 17a by riveting or the like, while the skin 23 forming the flap upper surface is attached to formers 18, 18a in a manner to be described below. The upper and lower skins are spaced apart to leave gaps 24, 25 near the flap leading and trailing edges.

The upper skin 23 of the flap is made up of two panels 23a, 23b. These panels are rigidly secured to formers 18a at stations $C_1$, $C_2$ only by spot welding at 26 and by rivets at 27. Each panel is formed with a slit 28 extending from a point just forward the rivet 27 to the flap leading edge, and the slit is covered by a strip 29 also secured by rivet 27. At the flap leading edge, the panels 23a, 23b and the covering strips 29 are wrapped around tubular rods as will be described below.

Figure 4:
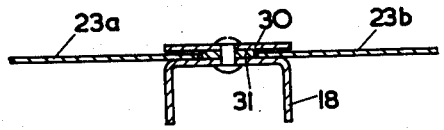
FIGURES 4 and 5 are fragmentary sectional views taken on the lines IV—IV and V—V in FIGURE 1.

The two panels 23a, 23b are attached to the former 18 at station A in the manner shown in FIGURE 4. The edges of the panels fit freely under a cover strip 30 rigidly secured by rivets to the former but spaced therefrom by washers 31. The washers are of slightly greater thickness than the panels (in FIGURE 4 the difference in thickness has been exaggerated) and the edges of the panels are scalloped or cut away to leave clearance around the washers.

Figure 5:
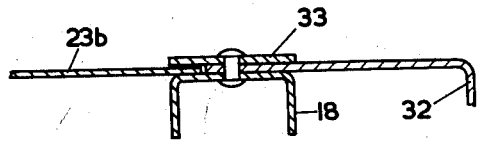

The ends of the flap are closed by end caps 32. The end caps 32 and cover strips 33 are rigidly secured by rivets to the formers 18 at stations $B_1$, $B_2$ and the ends of the panels 23a, 23b fit freely between the cover strips 33 and the formers 18 as shown in FIGURE 5. The end caps are of slightly greater thickness than the panels and a clearance is left between them. The difference in thickness has been exaggerated in the drawing.

Figure 6:
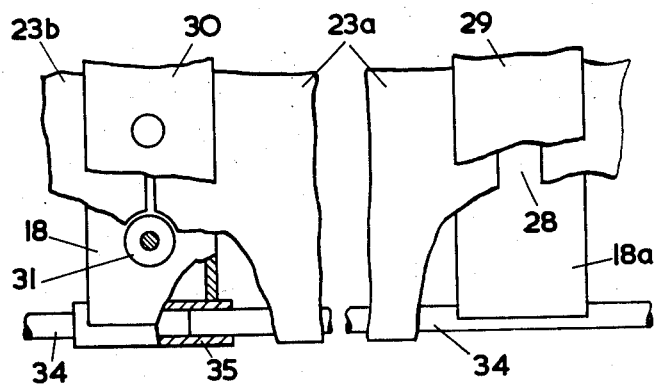
FIGURE 6 is a fragmentary view of the flap leading edge, parts being shown as broken away to reveal the construction.

As mentioned above, the panels 23a, 23b are wrapped around tubular rods 34—see FIGURE 6—at the flap leading edge. There are two such tubes, and these are welded or similarly secured at their mid points to the formers 18a at stations $C_1$, $C_2$ while their ends freely engage in tubes 35 welded or similarly secured to the formers 18 at stations A, $B_1$, $B_2$. The panels and the reinforcing strips 29 and 30 are formed with hooks or loops which are partly or wholly wrapped round the tubes but which are not otherwise secured thereto.

Figure 7:
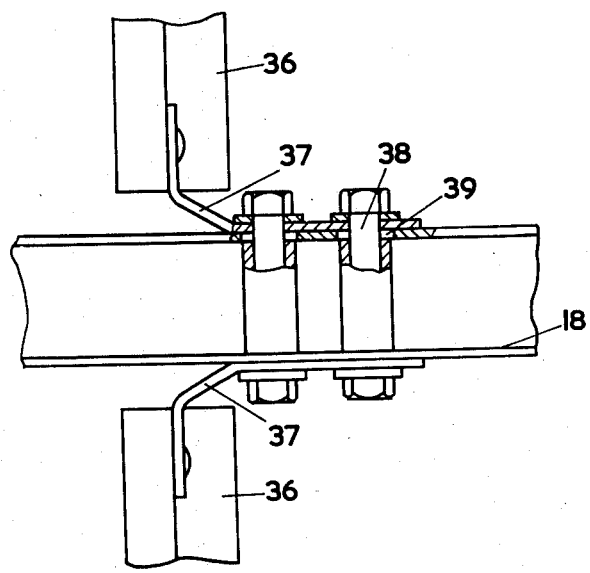
FIGURE 7 is a view of a detail of the flap.

The rearward parts of the panels 23a, 23b are stiffened by spanwise-extending approximately Z-section stiffeners 36 secured thereto—see FIGURES 2 and 3. The ends of these stiffeners are connected to the flanges of the formers 18 by brackets 37—see FIGURE 7—which are riveted to the stiffeners and are bolted to the former 18 by bolts 38 engaging in slots 39, the bolts being only finger tight.

By means of the construction described above the maximum freedom for thermal expansion is provided while a rigid structure is maintained. The pivotal attachment of the formers 18, 18a to the arms 16 and the links 19, 20, 20a permit the formers to expand without distortion. The clearances between the edges of the panels and the washers 31, end caps 32 and cover strips 30, 33 permit the panels to expand freely both chordwise and spanwise from the central anchorage constituted by spot welds 26 and rivets 27. The slits 28 also allow for thermal expansion of the forward part of the flap. The forward ends of the panels are free to slide on the tubes 34 while these tubes are free to slide within tubes 35. The brackets 37 and the slotted bolt holes 39 allow the stiffeners 36 to expand independently of the formers 18 and the panels 23a, 23b. The gaps 24, 25 permit a flow of cooling air through the interior of the flap.

We claim:

1. A jet deflecting flap for a jet flap aircraft comprising inner supporting structure, at least one panel extending chordwise from the flap leading edge to the flap trailing edge and forming the flap upper surface, and means securing the panel to the supporting structure with freedom for expansion of the panel both chordwise and spanwise.

2. A jet deflecting flap for a jet flap aircraft comprising inner supporting structure including at least two chordwise-extending formers spaced from one another in a spanwise sense, each former corresponding in profile to at least part of the flap upper surface, at least one panel forming the flap upper surface, means rigidly securing the panel to one former, and means attaching the panel to the other former with freedom for expansion both chordwise and spanwise.

3. A jet deflecting flap for a jet flap aircraft comprising inner supporting structure including at least three chordwise-extending formers spaced from one another in a spanwise sense, each former corresponding in profile to at least part of the flap upper surface, at least one panel forming the flap upper surface, means rigidly securing the panel at a position intermediate its ends to the intermediate former, and means attaching the panel at its ends to the other formers with freedom for expansion both chordwise and spanwise.

4. A flap according to claim 3 wherein the panel is secured to the intermediate former only at an anchorage intermediate the flap leading and trailing edges.

5. A flap according to claim 3 wherein the attaching means of the panel to each of said other formers comprises a cover strip rigidly secured to the former, the end of the panel fitting freely between the strip and the former with clearance for spanwise expansion.

6. A flap according to claim 4 wherein the panel is formed with a slit extending forwardly to the flap leading edge from its said anchorage to the intermediate former.

7. A flap according to claim 6 further comprising a cover strip overlying the slit.

8. A flap according to claim 3 further comprising a rod extending along the flap leading edge, said rod being secured intermediate its ends to said intermediate former and freely engaging at its ends in tubes secured to said other formers, the leading edge of the panel being wrapped around said rod.

9. A flap according to claim 3 further comprising a stiffener secured to the rearward part of the panel and extending between said other formers.

10. A jet deflecting flap for a jet flap aircraft comprising an internal spanwise-extending torque tube, a plurality of chordwise-extending formers spaced from one another in a spanwise sense, each former corresponding in profile to at least part of the flap upper surface, means supporting each formers on the torque tube, said means including at least two arms extending from the torque tube, the former being pivotally attached at a position intermediate the flap leading and trailing edges to one arm, and a pivoted link connecting the other arm to the former at the flap leading edge, and at least one panel forming the flap upper surface and secured to the formers.

11. A flap according to claim 10 wherein the supporting means of at least one former on the torque tube includes a further arm extending from the torque tube, the former being connected to this arm at the flap trailing edge through a sliding attachment permitting relative chordwise movement.

12. A flap according to claim 10 comprising means securing the panel to the formers with freedom for expansion of the panel both chordwise and spanwise.

13. A flap according to claim 3 comprising end caps secured to the formers at the ends of the flaps.

References Cited in the file of this patent

UNITED STATES PATENTS

| | | |
|---|---|---|
| 1,095,952 | Arnoux | May 5, 1914 |
| 1,724,456 | Crook | Aug. 13, 1929 |
| 1,918,897 | Colburn | July 18, 1933 |